United States Patent
Nishiyama

(10) Patent No.: US 8,068,239 B2
(45) Date of Patent: Nov. 29, 2011

(54) IMAGE FORMING APPARATUS WITH ADAPTIVE AUTOMATIC LAYOUT FUNCTION

(75) Inventor: Jun Nishiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 12/173,497

(22) Filed: Jul. 15, 2008

(65) Prior Publication Data

US 2009/0033999 A1 Feb. 5, 2009

(30) Foreign Application Priority Data

Aug. 3, 2007 (JP) ................. 2007-203424

(51) Int. Cl.
*G06F 15/00* (2006.01)
*G03G 15/01* (2006.01)

(52) U.S. Cl. ........................ 358/1.12; 399/44

(58) Field of Classification Search .......... 358/1.12, 358/1.15, 1.16, 1.18, 1.13, 1.14, 3.13, 3.1, 358/1.9, 1.1, 528, 538, 1.2, 3.28, 488, 404; 382/131, 100, 298, 197; 399/12, 44, 45, 66, 302; 400/62

See application file for complete search history.

(56) References Cited

U.S. PATENT DOCUMENTS 7,646,517 B2 * 1/2010 Maki et al. .................. 358/538

FOREIGN PATENT DOCUMENTS

JP 2006-238289 9/2006

* cited by examiner

*Primary Examiner* — Saeid Ebrahimi Dehkordy

(74) *Attorney, Agent, or Firm* — Fitzpatrick, Cella, Harper & Scinto

(57) ABSTRACT

It is determined whether each of objects separated from a plurality of objects arranged in a single page is character object or not, and with respect to an object determined as a character object, a ratio of pixels configuring a character in the determined object to all pixels in said determined object is calculated. A character object in which the ratio crosses a predetermined reference value, when the plurality of objects in the single page are scaled and arranged in accordance with a size of a sheet set by a user, is arranged in a different page.

22 Claims, 13 Drawing Sheets

FIG. 5A

PAGE LAYOUT TABLE IN EMBODIMENT 1 (EMBODIMENT 3)
(3001)

| | Position (3002) | Group (3003) | CharFlag (3004) | Thin Line Flag (3007) | Object Pointer (3005) |
|---|---|---|---|---|---|
| Object0 | (0,0)(xmax,Ymax) | Null | 0 | 0 | 0x******** |
| Object1 | (xo,Yo)(xmax,Ymax) | Null | 0 | 0 | 0x******** |
| Object2 | (xo,Yo)(xmax,Ymax) | Null | 0 | 0 | 0x******** |
| Object3 | (xo,Yo)(xmax,Ymax) | Null | 0 | 0 | 0x******** |
| Object4 | (xo,Yo)(xmax,Ymax) | 1 | 1 | 0 | 0x******** |
| Object5 | (xo,Yo)(xmax,Ymax) | 1 | 0 | 1 | 0x******** |
| | COMMON | COMMON | EMBODIMENT 1 | EMBODIMENT 3 | COMMON |

FIG. 5B

Object Group List (3006)

| Group1 | Object4,5 |
|---|---|

OBJECT DIVISION

| | | | | | | | | | |
|---|---|---|---|---|---|---|---|---|---|
| An estimate | | | | | | | | | |
| Item A | | | | | $100 | | | | |
| Item B | | | | | $100 | | | | |
| Item C | | | | | $100 | | | | |
| Total | | | | | $300 | | | | |

BLOCK OF PREDETERMINED SIZE (4001)

FIG.6

EXAMPLE WHERE BLOCK OF PREDETERMINED
SIZE IS 10 Pixel BY 10 Pixel
NUMBER OF PIXELS IN ENTIRE
BLOCK OF PREDETERMINED SIZE : 100
NUMBER OF PIXELS HAVING
CHARACTER ATTRIBUTES : 18
RATIO OF CHARACTER PIXELS : 18%
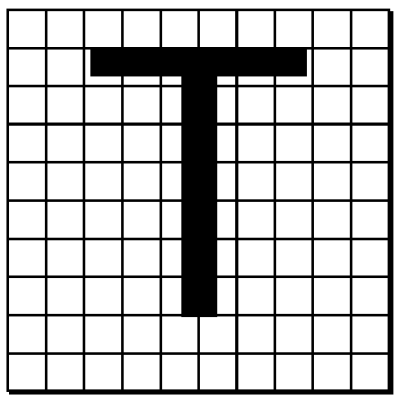
INPUT IMAGE DATA
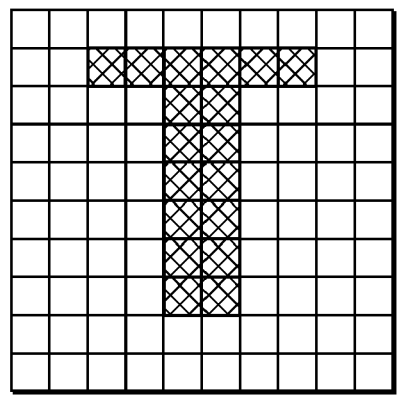
⊠ PIXEL HAVING
CHARACTER ATTRIBUTE
FIG.8

PAGE LAYOUT TABLE 1
(8100)

| | Position (3002) | Group (3003) | CharFlag (3004) | Thin Line Flag(3007) | Object Pointer (3005) |
|---|---|---|---|---|---|
| Object0 | (0,0) ($x_{max}$,$y_{max}$) | Null | 0 | 0 | 0x******** |
| Object1 | ($x_0$,$y_0$) ($x_{max}$,$y_{max}$) | Null | 0 | 0 | 0x******** |
| Object2 | ($x_0$,$y_0$) ($x_{max}$,$y_{max}$) | Null | 0 | 0 | 0x******** |
| Object3 | ($x_0$,$y_0$) ($x_{max}$,$y_{max}$) | Null | 0 | 0 | 0x******** |

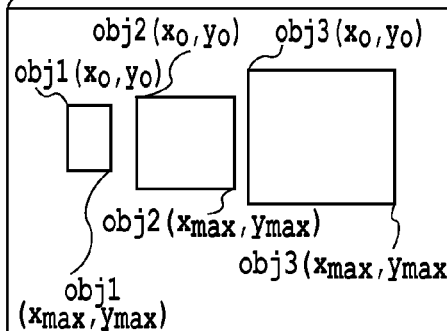

FIG.10A

PAGE LAYOUT TABLE 2
(8200)

| | Position (3002) | Group (3003) | CharFlag (3004) | Thin Line Flag(3007) | Object Pointer (3005) |
|---|---|---|---|---|---|
| Object0 | (0,0) ($x_{max}$,$y_{max}$) | Null | 0 | 0 | 0x******** |
| Object4 | ($x_0$,$y_0$) ($x_{max}$,$y_{max}$) | 1 | 1 | 0 | 0x******** |
| Object5 | ($x_0$,$y_0$) ($x_{max}$,$y_{max}$) | 1 | 0 | 1 | 0x******** |

Object Group List(3006)

| Group1 | Object4,5 |
|---|---|

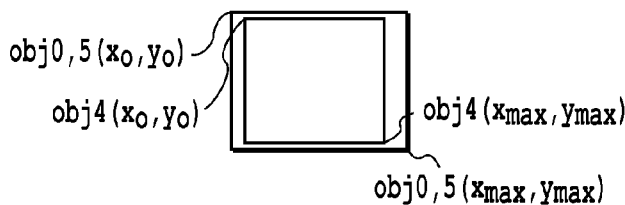

FIG.10B

IMAGE FORMING APPARATUS WITH ADAPTIVE AUTOMATIC LAYOUT FUNCTION

BACKGROUND OF THE INVENTION

1. Field of the Invention

The present invention relates to an image forming apparatus, particularly to an image forming apparatus with an adaptive automatic layout function for scaling and rearranging image data in accordance with a sheet size and a desired layout at the time of printing.

2. Description of the Related Art

Conventionally, when an image forming apparatus outputs the document created by a document processing apparatus or the like, print setting is performed. In print setting, an n in 1 print function of printing by allocating image data of n pages in a piece of paper, and a scaling function of fitting image data to a designated sheet size by scaling the image data have been frequently used.

Japanese Patent Laid-Open No. 2006-238289 proposes the method for restricting the character size of a document to be outputted not to be below a certain size. In this method, the lower limit of the recognizable character size differs depending on the kind of font and the kind of character (Japanese hiragana, Chinese characters and alphabets).

However, in the above described scaling function, when the image data is excessively reduced to be adapted into a determined area, the characters may become unrecognizable, and thin lines may not be printed.

SUMMARY OF THE INVENTION

The present invention provides an image forming apparatus with an adaptive automatic layout function that solves the above described problem.

According to an aspect of the present invention, an image forming apparatus for outputting an image corresponding to image data onto a sheet, the apparatus comprises: separating means for separating a plurality of objects from the image data, wherein the plurality of objects are arranged in a single page in accordance with the image data; determining means for determining whether each of the separated objects is a character object or not; calculating means for calculating with respect to an object determined as a character object a ratio of pixels configuring a character in the determined object to all pixels in the determined object to identify a character object in which the ratio crosses a predetermined reference value when the plurality of objects in the single page are scaled and arranged in a sheet whose size is set by a user; and performing means for performing process of read error suppression for the character object identified by said calculating means when it is outputted on a sheet.

According to another aspect of the present invention, an image forming apparatus for outputting an image corresponding to image data onto a sheet, the apparatus comprises: separating means for separating a plurality of objects from the image data, wherein the plurality of objects are arranged in a single page in accordance with the image data; determining means for determining whether each of the separated objects is a thin line object or not; calculating means for calculating, with respect to an object determined as a thin line object, a ratio of pixels configuring a thin line in the determined object to all pixels in the determined object to identify a thin line object in which the ratio crosses a predetermined reference value when the plurality of objects in the single page are scaled and arranged in a sheet whose size is set by a user; and performing means for performing process of read error suppression for the thin line object identified by said calculating means when it is outputted on a sheet of paper.

In each of the above described aspects, the performing means may include arranging means for arranging the plurality of objects on the sheet while adapting sizes of the plurality of objects to the user set size of the sheet, wherein the identified character object is rearranged on a different page, or may output an error message with respect to the identified character object.

According to another aspect of the present invention, an image forming method for outputting an image corresponding to image data onto a sheet, the method comprises the steps of: separating a plurality of objects from the image data, wherein the plurality of objects are arranged in a single page in accordance with the image data; determining whether each of the separated objects is a character object or not; calculating, with respect to an object determined as a character object, a ratio of pixels configuring a character in the determined object to all pixels in the determined object to identify a character object in which the ratio crosses a predetermined reference value when the plurality of objects in the single page are scaled and arranged in a sheet whose size is set by a user; and performing process of read error suppression for the character object identified in said calculating step when it is outputted on a sheet.

According to another aspect of the present invention, an image forming method for outputting an image corresponding to image data onto a sheet, the method comprises the steps of: separating a plurality of objects from the image data, wherein the plurality of objects are arranged in a single page in accordance with the image data; determining whether each of the separated objects is a thin line object or not; calculating, with respect to an object determined as a thin line object, a ratio of pixels configuring a thin line in the determined object to all pixels in the determined object to identify a thin line object in which the ratio crosses a predetermined reference value when the plurality of objects in the single page are scaled and arranged in a sheet whose size is set by a user; and performing process of read error suppression for the thin line object identified in said calculating step when it is outputted on a sheet of paper.

In each of the above described modes, the performing step may include a step of arranging the plurality of objects on the sheet while adapting sizes of the plurality of objects to the user set size of the sheet, wherein the identified character object is rearranged on a different page, or may include outputting an error message with respect to the identified character object.

According to the present invention, by performing reduction layout by scaling the layout within the range in which characters are not too reduced to be recognizable, a document can be included in a frame as designated. On this occasion, the range in which the characters are not too reduced to be recognizable can be properly set for each block.

Further features of the present invention will become apparent from the following description of exemplary embodiments (with reference to the attached drawings).

BRIEF DESCRIPTION OF THE DRAWINGS

FIG. 5A is an explanatory diagram explaining a page layout table;

FIG. 5B is an explanatory diagram explaining an object group list;

FIG. 6 is an explanatory diagram explaining an example of dividing an object into blocks each having a predetermined size;

FIG. 8 is an explanatory diagram explaining a method for calculating a ratio of character pixels;

FIGS. 10A and 10B are explanatory diagrams explaining a page layout when a character object in which the ratio of the character pixels crosses a reference value exists in the processing according to embodiment 1;

DESCRIPTION OF THE EMBODIMENTS

Embodiment 1

Figure 1:
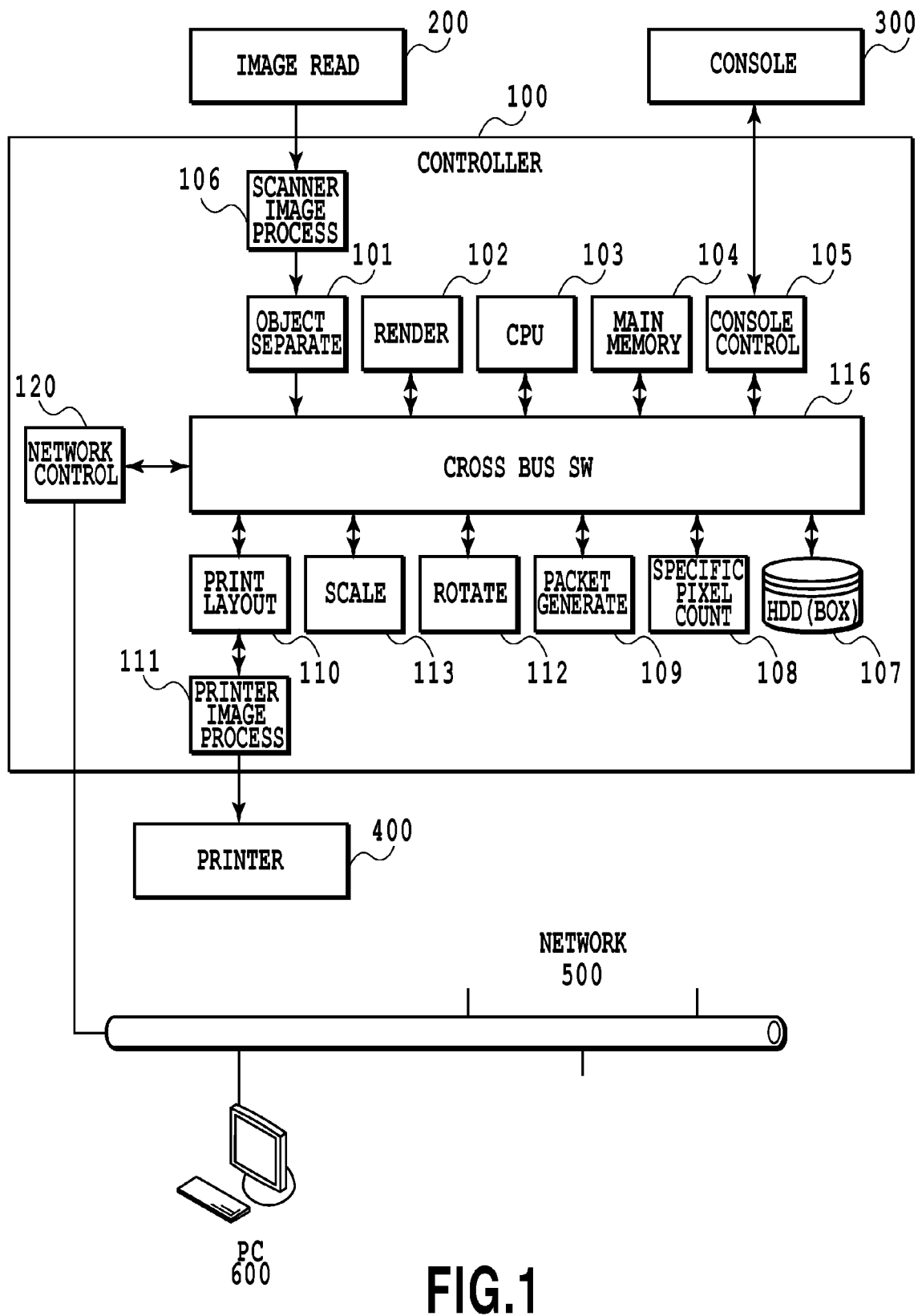
FIG. 1 is a block diagram showing a configuration of an entire system according to an image forming apparatus of the present invention.

FIG. 1 illustrates a block diagram showing a configuration of an entire system according to an image forming apparatus which is embodiment 1 of the present invention. The configuration is used in common in other embodiments.

The image forming apparatus shown in FIG. 1 includes a controller 100, an image reader 200, a console 300 and a printer 400, and can be connected to a PC 600 via a network 500.

Figure 2:
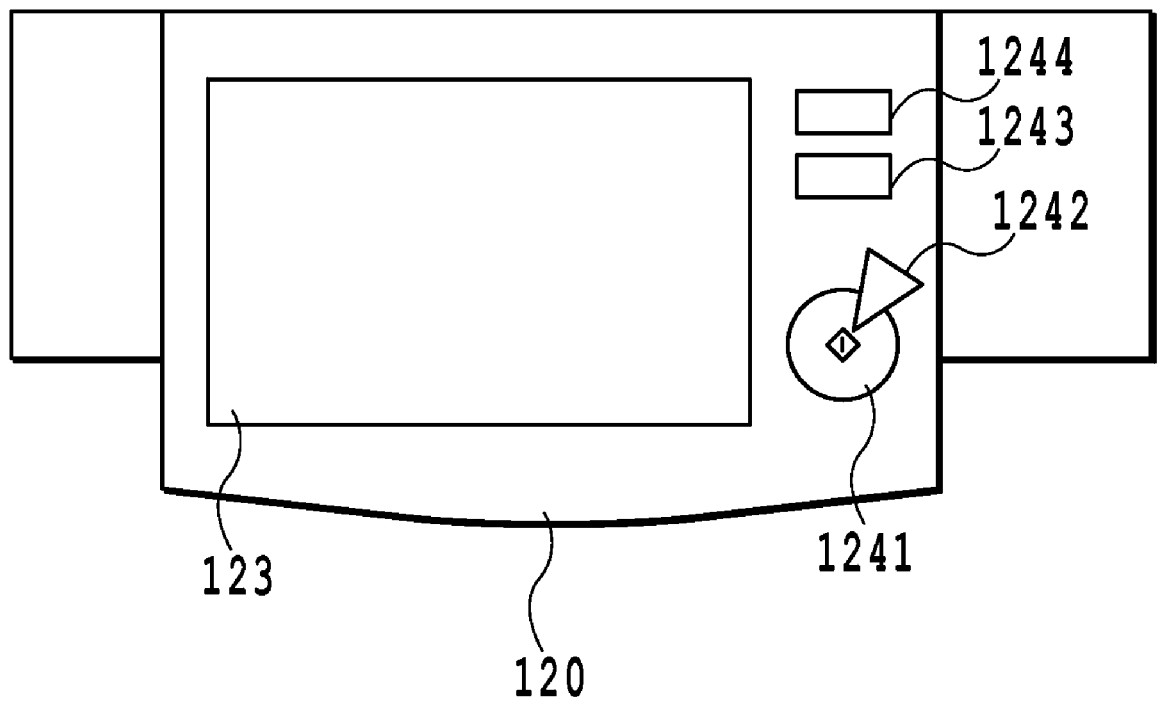
FIG. 2 is a view showing a configuration of an operation section of FIG. 1.

A configuration of the console 300 is shown in FIG. 2. A display 123 is controlled by a CPU 103, and displays an operating screen. Further, a touch panel sheet is bonded onto the display 123, and when a user touches the sheet, the display 123 transmits information for a touched position to the CPU 103. Then, the CPU 103 refers to displayed content on the operating screen and the information for the touched position, and thereby, recognizes selected operation. A start key 1241 is pressed by the user for starting an image reading operation or the like. A green LED 1244 and a red LED 1243 are located near the start key 1241, so that it is shown based on a lit LED color whether the start key is available or not. A stop key 1242 is pressed for stopping an operation being carried out.

The image reader 200 shown in FIG. 1 optically reads a paper original and converts an image on the original into electronic data. The original image is generally converted into continuous tone data (continuous density data) of RGB each having 8 bits. The electronic data created in the image reader 200 is transmitted to the controller 100 via a dedicated I/F.

Figure 3:
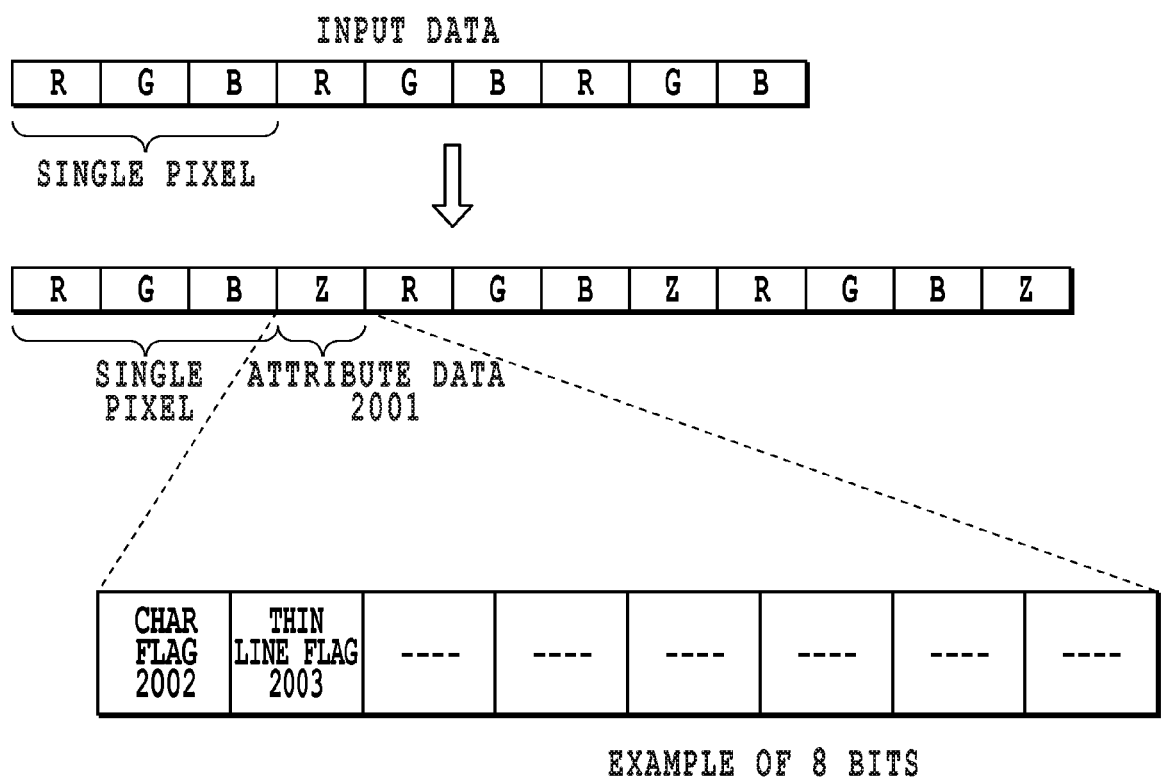
FIG. 3 is an explanatory diagram explaining addition of attribute data showing an attribute to each pixel of an input image.

In the controller section 100, a scanner image process section 106 performs image process including correction corresponding to characteristics of the image reader 200 for the input electronic data created in the image reader 200, and further adds attribute data 2001 indicative of an attribute to each pixel of the electronic data as shown in FIG. 3. The attribute data 2001 is configured with a plurality of bits, and includes a Char Flag 2002 indicating that the corresponding pixel is a pixel configuring a character, a Thin Line Flag 2003 indicating that the corresponding pixel is a pixel configuring a thin line, and the like.

Figure 4:
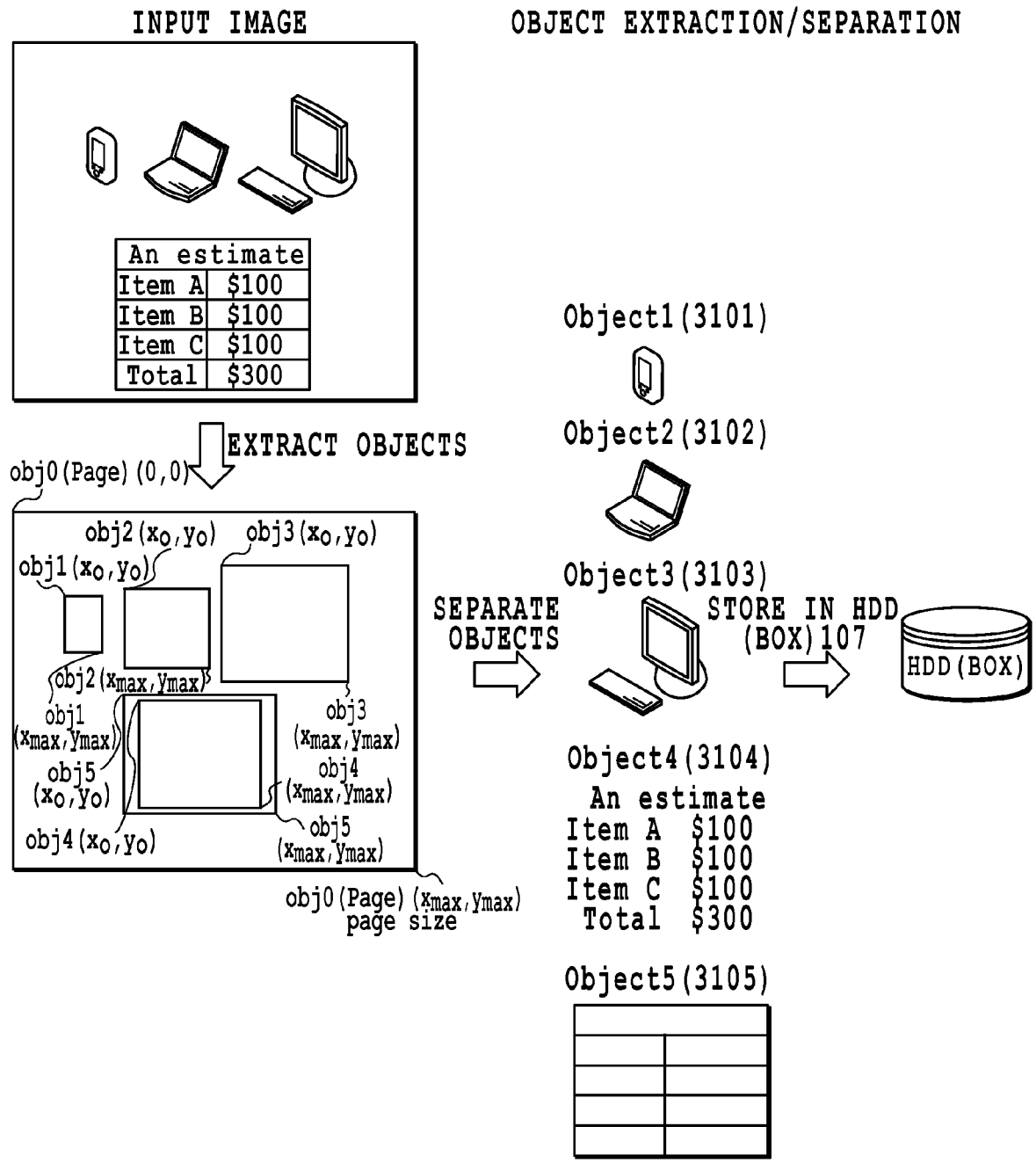
FIG. 4 is an explanatory diagram explaining an example of separating and extracting a plurality of objects from image data and storing the objects.

The data processed in the scanner image process section 106 is then separated into a plurality of objects in an object separator 101. FIG. 4 shows an example in which the input image is separated into five objects of Objects 1 to 5 (3101 to 3105), and the objects are extracted from the input image and stored in an HDD 107.

When the data is separated into a plurality of objects by the separator 101, it is determined whether each of the objects is character object, or other objects such as image data by referring to the attribute data 2001 with respect to the respective objects.

A determination result is temporarily stored in a main memory 104 together with the separated objects. Data transfer is performed with a cross bus switch 116 under a control of the CPU 103. The following process including data transfer between the respective components is similarly performed under a control of the CPU 103. When each of the objects is stored in the main memory 104, a page layout table 3001 and an Object Group List 3006 which are created by the object separator 101 shown in FIGS. 5A and 5B are also stored.

The page layout table 3001 is configured with a coordinate information Position (3002), an address Object Pointer (3005), a group information Group (3003) and a determination flag Char Flag (3004). The address Object Pointer (3005) shows addresses in which entities of objects are stored. The group information Group (3003) shows the groups to which the objects belong. The determination flag Char Flag (3004) shows whether the objects are characters or not. The coordinate information Position (3002) shows where in a page and in what size each of the objects should be arranged by x and y coordinates. The coordinate information Position (3002) is configured with coordinates (x0, y0) of a vertex which is the nearest to the origin (0, 0), and coordinates ($x_{max}$, $y_{max}$) of a vertex which is the farthest from the origin (0, 0), and is expressed as a position/size of a rectangle required for barely drawing the object. Accordingly, the coordinate information Position (3002) of an Object 0 which is a background image expresses a page size required for drawing all the objects.

A Thin Line Flag (3007) is shown in FIG. 5A to explain various embodiments of the present application with a reduced number of drawings by using FIG. 5A in common with another embodiment, and is not an element of the present embodiment. The elements shown by reference numerals 3002, 3003, 3004 and 3005 are the elements of the page layout table of the present embodiment.

The Object Group List 3006 (FIG. 5B) shows a list of the objects belonging to each group, and is expressed as the list of ID which is assigned to each object. In the example of the input image shown in FIG. 4, a ruled line Object 5 (3105) configuring the table and a character Object 4 (3104) in the table are treated as a single group because processes of shift, rotation, up/down scaling and the like of the objects need to be synchronously performed.

The object data which is temporarily stored in the main memory 104 is divided into a plurality of blocks (4001), each having a predetermined size, and each of the blocks is transmitted into a specific pixel counter 108. FIG. 6 shows an example of dividing the object Object 5 (3105) into 100 blocks, each having a predetermined size.

The specific pixel counter 108 counts the number of pixels each having attribute data which is separately set for each divided and transmitted block of the predetermined size, and transfers the counted value and the divided object data packet to a packet generator 109. When an object which is determined as a character is transmitted, the object data is transmitted after a value of attribute data showing character attribute is in advance set in the counter 108. Thereby, the counter 108 counts the number of pixels indicative of character attribute, and notifies a packet generator 109 of the count value for each block of the predetermined size.

Figure 7:
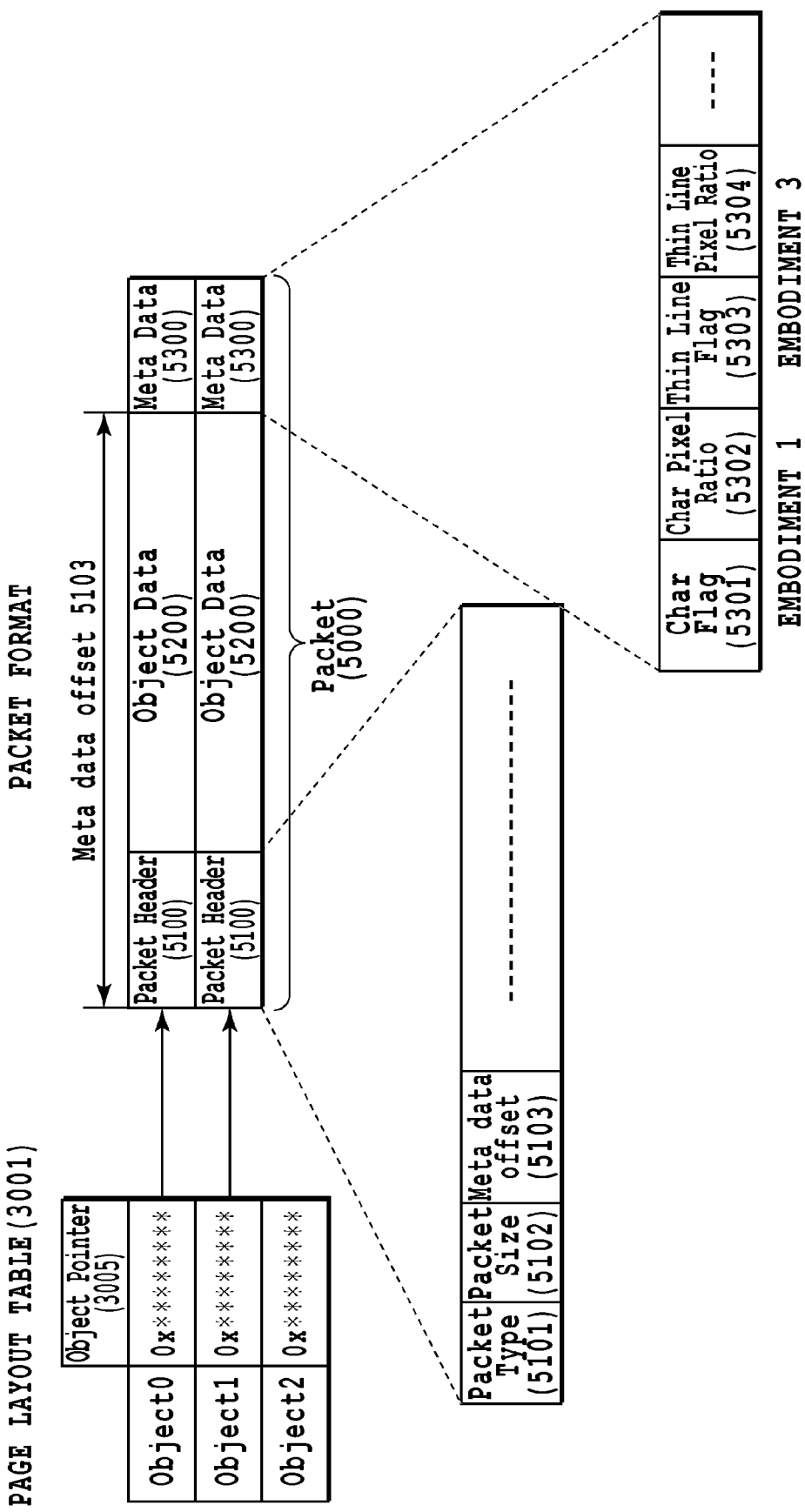
FIG. 7 is an explanatory diagram explaining a method for storing an object into an HDD (BOX) in FIG. 1.

The packet generator 109 stores the received object data into a Packet (5000) in accordance with a format specified as shown in FIG. 7.

The Packet (5000) in an example of the packet format shown in FIG. 7 is configured with by a Packet Header (5100), an Object Data (5200) and a Meta Data (5300). The Packet Header (5100) includes a Packet Type (5101), a Packet Size (5102), a Meta Data Offset (5103) and the like. The Packet Type (5101) is a field for writing the kind of Packet. When the Packet stores object data, ID assigned to the Packet storing object data is written. The Packet Size (5102) is a field for writing a size of the entire Packet. The Meta Data Offset (5103) is a field for writing a size from the head of the Packet (5000) to the head of the Meta Data (5300). A head address of the Meta Data (5300) is found as follows.

Head address of Meta Data=Head address of Packet+ Meta Data Offset

The data of the entities configuring the objects is stored in the Object Data (5200).

Further, the Meta Data (5300) corresponding to the objects is created and stored in the Packet (5000). A flag Char Flag (5301) showing whether the object is a character or not is recorded as the Meta Data (5300). When the object is a character object, a ratio of character pixel Char Pixel Ratio (5302) is also recorded.

A Thin Line Flag (5303) and a Thin Line Pixel Ration (5304) are shown in FIG. 6 for explaining various embodiments with a reduced number of drawings by using FIG. 6 in common with another embodiment, and are not elements of the present embodiment.

The ratio of character pixels which the flag Char Pixel Ratio (5302) shows in the present embodiment is a value obtained by dividing the largest number of pixels out of the numbers of pixels having character attribute which are counted for respective blocks of a predetermined size by the number of all the pixels in all the blocks of the predetermined size.

Specifically, in an example of an object in which the block 4001 of a predetermined size is constituted of 10 pixels by 10 pixels as shown in FIG. 8, when the counted value of the number of pixels having character attribute is 18 pixels, the ratio of character pixels to all the pixels is 18%.

A packetized data is stored in the HDD (BOX) 107 via the cross bus switch 116. When the packet data is stored in the HDD (BOX) 107, the page layout table 3001 is also stored at the same time, and the Object Pointer (3005) of the page layout table 3001 is replaced with a proper address on the HDD (BOX) 107.

When the image data stored in the HDD (BOX) 107 is printed on a paper, the packet data is stored back in the main memory 104 based on the page layout table 3001 in the HDD (BOX) 107, and the page layout table 3001 is also reconstructed according to the data.

Figure 9:
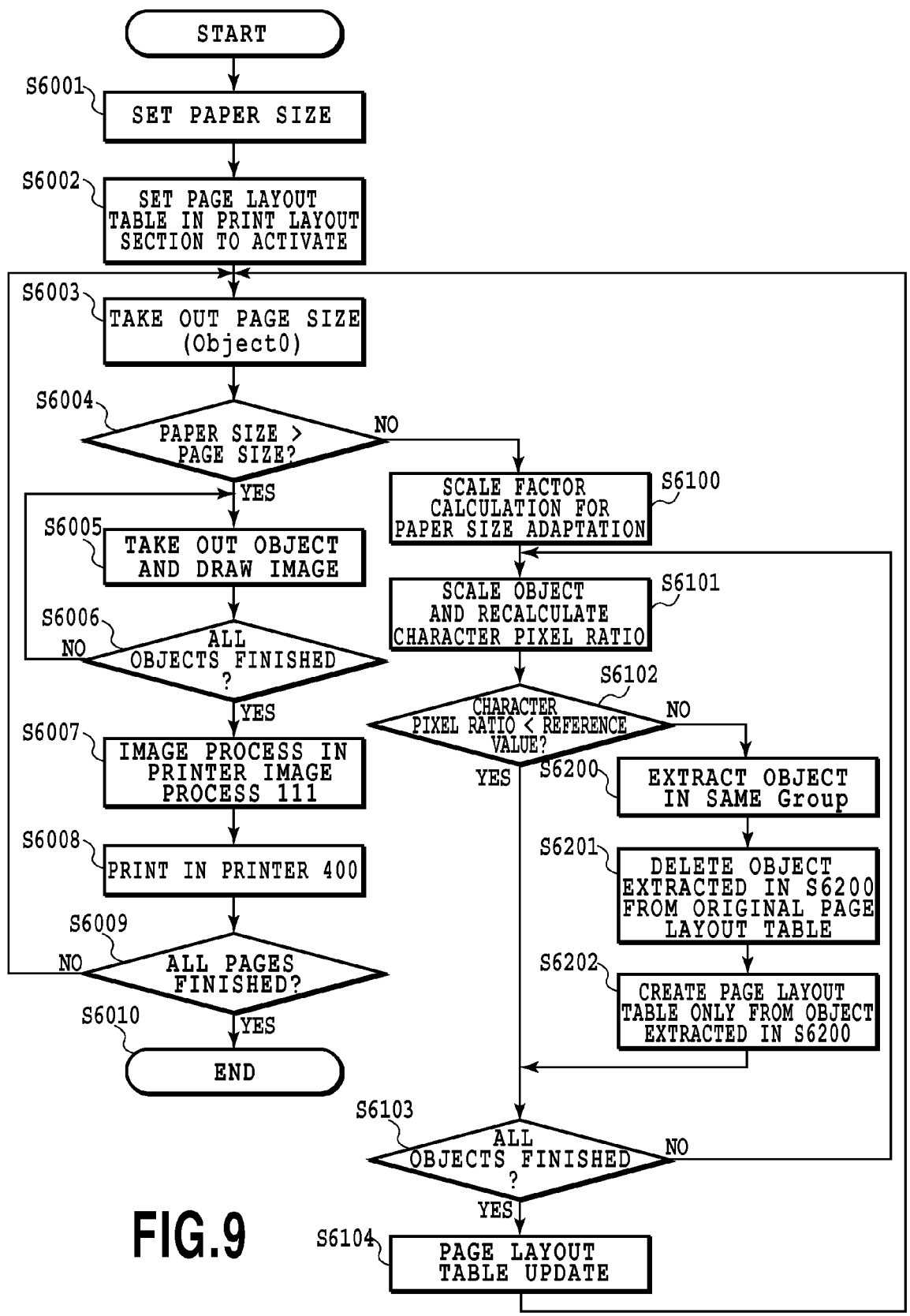
FIG. 9 is a flowchart explaining processing according to embodiment 1 of the present invention.

Thereafter, in accordance with a process shown in flowcharts in FIG. 9, print output corresponding to an instruction of a user or an operator is performed. Specifically, a sheet size is set in the print layout section 110 in accordance with print setting of a user or an operator (S6001), and the page layout table is set to start an operation (S6002).

Thereupon, the print layout section 110 initially takes out the first Object 0 from the packet data in accordance with the page layout table 3001 in FIG. 5A (S6003).

Since the Object 0 is a background, a page size of an output paper is decided from a size of the object. Then, the sheet size set in step S6001 are compared with the decide page size, and it is determined whether the page size is smaller than the sheet size or not (whether the page size remains in the sheet size without reducing or down-scaling) (S6004).

If there is no need for reducing or down-scaling, the object data is taken out from the main memory 104, and is arranged at a position determined in accordance with the reconstructed page layout table 3001, whereby a raster image to be printed is configured (S6005). The raster image is processed in accordance with characteristics of the printer 400 in a printer image process section 111 (S6007), and is printed onto a paper by the printer 400 (S6008).

In step S6002, a plurality of page layout tables can be set. When printing in the print section 400 is finished with respect to all the page layout tables set in step S6002, the process ends (S6010).

Meanwhile, when the sheet size is smaller than the page size in step S6004, the print layout section 110 calculates a scale factor for adapting the page size of the output image to the set sheet size (S6100).

Then, each Object is taken from the main memory 104, and a scaler 113 scales each Object down with the scale factor calculated in step S6100, and transmits the reduced data to the specific pixel counter 108, and the specific pixel counter 108 calculates a ratio of character pixels again (S6101).

When the ratio of the character pixels recalculated in step S6101 is no greater than a predetermined reference value, the page layout table 3001 is updated to correspond to the objects which were down-scaled in step S6101 (S6104).

The predetermined reference value for character pixel ratio depends on characteristics of the printer 400. Therefore, for several kinds of the printer 400, reference values are experimentally found and stored in the HDD (BOX) 107 or the like.

Meanwhile, when the character object for which the ratio of the character pixels recalculated in step S6101 crosses the reference value determined in advance is present, process from step S6200 is performed. Specifically, an object associated with the character object is specified (S6200) by referring to the Object Group List (3006), and two of those related or associated objects are deleted from the original page layout table 3001 (S6201). Next, a page layout table which is configured by including the related or associated objects deleted from the original page layout table 3001 and the background and does not include the other objects is created (S6202). The new page layout table is used for rearranging the two related or associated objects in a page different from the original page.

A page size of the page layout table which is created is made to the minimum rectangle size including all the objects specified in step S6201. The page layout table created in step S6202 is additionally set to the print layout section 110 in step S6104, and the process from step S6003 is executed again.

FIGS. 10A and 10B show an example of updating an original page layout table and creating a new different page layout table when it is determined in step S6102 that a ratio of character pixels recalculated in step S6101 with respect to the Object 4 crosses a reference value.

First, it is found that the Object 4 belongs to a Group 1 from the page layout table (3001), and it is found that another Object which belongs to the Group 1 is the Object 5 from the Object Group List (3006) (S6200). Then, two page layout tables, a page layout table 1 (8100) shown in FIG. 10A which is a result of excluding the Objects 4 and 5 from the original page layout table (3001) and a new different page layout table (8200) shown in FIG. 10B including the Objects 0, 4 and 5, are created.

The page size (size of the Object 0) in the page layout table (8200) 2 is the minimum rectangle including the Object 4 and Object 5, and therefore, it is the minimum rectangle required for drawing the Object 5 in this example.

The page layout tables are thus updated (S6104), and the process from step S6003 is executed for each of the updated tables.

By printing each of the objects with the arrangement/size in accordance with the above described two page layout tables, a plurality of objects included in a single page in the original image date are automatically separated into two pages and arranged for printing. One of the pages is printed as the page in accordance with the page layout table 1. The other page including the character objects each having the ratio of the character pixels crossing the reference value is printed in accordance with the page layout table 2, and is printed so that the page size is the minimum rectangle including the Objects 4 and 5 within a range in which the character of the Object 4 is not too reduced to be recognized or read.

Embodiment 2

Figure 11:
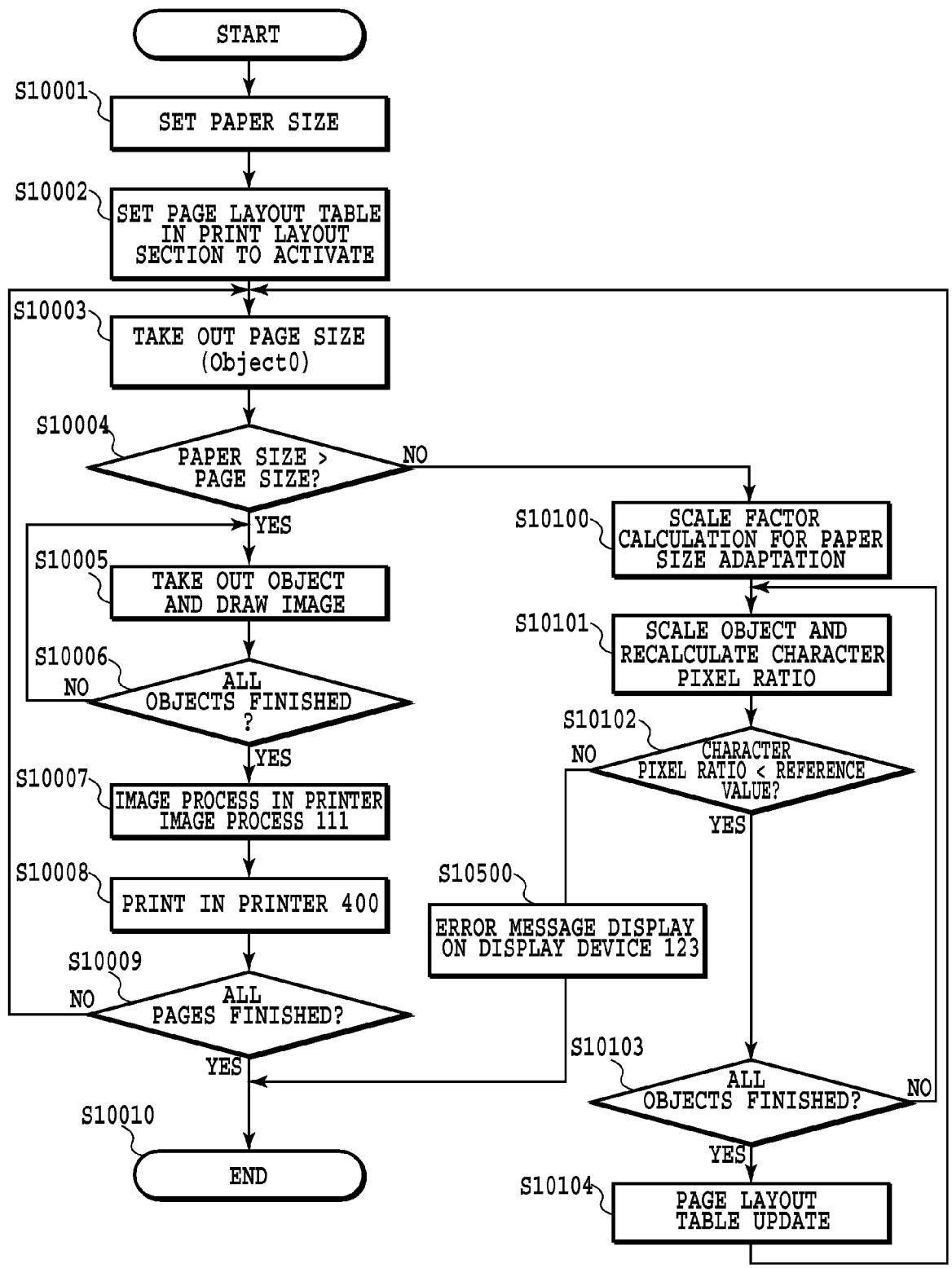
FIG. 11 is a flowchart explaining processing according to embodiment 2 of the present invention.

FIG. 11 is a flowchart for explaining a process according to embodiment 2 of the present invention.

In embodiment 1, the character objects with the ratios of the character pixels recalculated in step S6101 crossing the predetermined reference value are rearranged in a different page. According to the present embodiment an error message is displayed in such a case. Specifically, with respect to a character object in which a ratio of character pixels recalculated in step S10101 crosses a predetermined reference value, an error message is displayed on the display 123 in step S10500 and then the process ends.

Alternately, instead of the error message display for rearrangement on a different page, rearranging on a different page and displaying a massage informing that the arrangement is changed may be carried out in combination.

Embodiment 3

Embodiment 3 will be described with reference to FIG. 1.

The image reader 200 shown in FIG. 1 optically reads a paper original and converts an image on the original into electronic data. The original image is generally converted into continuous tone data (continuous density data) of RGB each having eight bits. The electronic data created in the image reader 200 is transmitted to the controller 100 via a dedicated I/F.

In the controller section 100, a scanner image process section 106 performs image process including correction corresponding to characteristics of the image reader 200 for the input electronic data created in the image reader 200, and further adds attribute data 2001 indicative of attributes to each pixel of the electronic data as shown in FIG. 3. The attribute data 2001 is configured with a plurality of Bits, and includes a Char Flag 2002 indicating that the corresponding pixel is a pixel configuring a character, a Thin Line Flag 2003 indicating that the corresponding pixel is a pixel configuring a thin line, and the like.

The data processed in the scanner image process section 106 is then separated into a plurality of objects in an object separator 101. FIG. 4 shows an example in which the input image is separated into five objects of Objects 1 to 5 (3101 to 3105), and the objects are extracted from the input image and stored in an HDD 107.

When the data is separated into a plurality of objects by the object separator 101, it is determined whether the objects are thin line object, or other objects such as image data by referring to the attribute data 2001 with respect to the respective objects.

A determination result is temporarily stored in a main memory 104 together with the separated objects. Data transfer is performed with a cross bus switch 116 under a control of the CPU 103. The following process including data transfer between the respective components is similarly performed under a control of the CPU 103. When each of the objects is stored in the main memory 104, a page layout table 3001 and an Object Group List 3006 which are created by the object separator 101 shown in FIGS. 5A and 5B are also stored.

The page layout table 3001 is configured with a coordinate information Position (3002), an address Object Pointer (3005), a group information Group (3003) and a determination flag Thin Line Flag (3007). The address Object Pointer (3005) shows addresses in which entities of objects are stored. The group information Group (3003) shows the groups to which the objects belong. The determination flag Thin Line Flag (3007) shows whether the objects are thin lines or not. The coordinate information Position (3002) shows where in a page and in what size each of the objects should be arranged by x and y coordinates. The coordinate information Position (3002) is configured with coordinates (x0, y0) of a vertex which is the nearest to the origin (0, 0), and coordinates ($x_{max}$, $y_{max}$) of a vertex which is the farthest from the origin (0, 0), and is expressed as a position/size of a rectangle required for barely drawing the object. Accordingly, the coordinate information Position (3002) of an Object 0 which is a background image expresses a page size required for drawing all the objects.

A Thin Line Flag (3004) in FIG. 5A is shown to explain various embodiments of the present application with a reduced number of drawings by using FIG. 5A in common with the embodiment 1, and is not an element of the present embodiment. The elements shown by reference numerals 3002, 3003, 3005 and 3007 are the elements of the page layout table of the present embodiment.

The Object Group List 3006 (FIG. 5B) shows a list of the objects belonging to each group, and is expressed as the list of ID which is assigned to each object. In the example of the input image shown in FIG. 4, a ruled line Object 5 (3105) configuring the table and a character Object 4 (3104) in the table are treated as a single group because processes of shift, rotation, up/down scaling and the like of the objects need to be synchronously performed.

The object data which is temporarily stored in the main memory 104 is divided into a plurality of blocks (4001) each having a predetermined size, and each of the blocks is transmitted into a specific pixel counter 108. FIG. 6 shows an example of dividing the object Object 5 (3105) into 100 blocks each having a predetermined size.

The specific pixel counter 108 counts the number of pixels each having attribute data which is separately set for each divided and transmitted block of the predetermined size, and transfers the counted value and the divided object data packet to a packet generator 109. When an object which is determined as a thin line is transmitted, the object data is transmitted after a value of attribute data showing thin line attribute is in advance set in the counter 108. Thereby, the counter 108 counts the number of pixels indicative of thin line attribute, and notifies a packet generator 109 of the count value for each block of the predetermined size.

The packet generator 109 stores the received object data into a Packet (5000) in accordance with a format specified as shown in FIG. 7.

The Packet (5000) in an example of the packet format shown in FIG. 7 is configured with by a Packet Header (5100), an Object Data (5200) and a Meta Data (5300). The Packet Header (5100) includes a Packet Type (5101), a Packet Size (5102), a Meta Data Offset (5103) and the like. The Packet Type (5101) is a field for writing the kind of Packet. When the Packet stores object data, ID assigned to the Packet storing object data is written. The Packet Size (5102) is a field for writing a size of the entire Packet. The Meta Data Offset (5103) is a field for writing a size from the head of the Packet (5000) to the head of the Meta Data (5300). A head address of the Meta Data (5300) is found as follows.

Head address of Meta Data=Head address of Packet+ Meta Data Offset

The data of the entities configuring the objects is stored in the Object Data (5200).

Further, the Meta Data (5300) corresponding to the objects is created and stored in the Packet (5000). A flag Thin Line Flag (5303) showing whether the object is a thin line or not is recorded as the Meta Data (5300). When the object is a thin line object, a ratio of thin line pixel Thin Line Pixel Ratio (5304) is further recorded.

A Char Flag (5301) and a Char Pixel Ratio (5302) in FIG. 6 are shown for explaining various embodiments with a reduced number of drawings by using FIG. 6 in common with embodiment 1, and are not the elements of the present embodiment.

The ratio of the thin line pixels which the flag Thin Line Pixel Ratio (5304) shows in the present embodiment is a value obtained by dividing the largest number of pixels out of the numbers of pixels having thin line attribute which are counted for respective blocks of a predetermined size by the number of all the pixels in all the blocks of the predetermined size.

A packetized data is stored in the HDD (BOX) 107 via the cross bus switch 116. When the packet data is stored in the HDD (BOX) 107, the page layout table 3001 is also stored at the same time, and the Object Pointer (3005) of the page layout table 3001 is replaced with a proper address on the HDD (BOX) 107.

When the image data stored in the HDD (BOX) 107 is printed on a paper, the packet data is stored back in the main memory 104 based on the page layout table 3001 in the HDD (BOX) 107, and the page layout table 3001 is also reconstructed according to the data.

Figure 12:
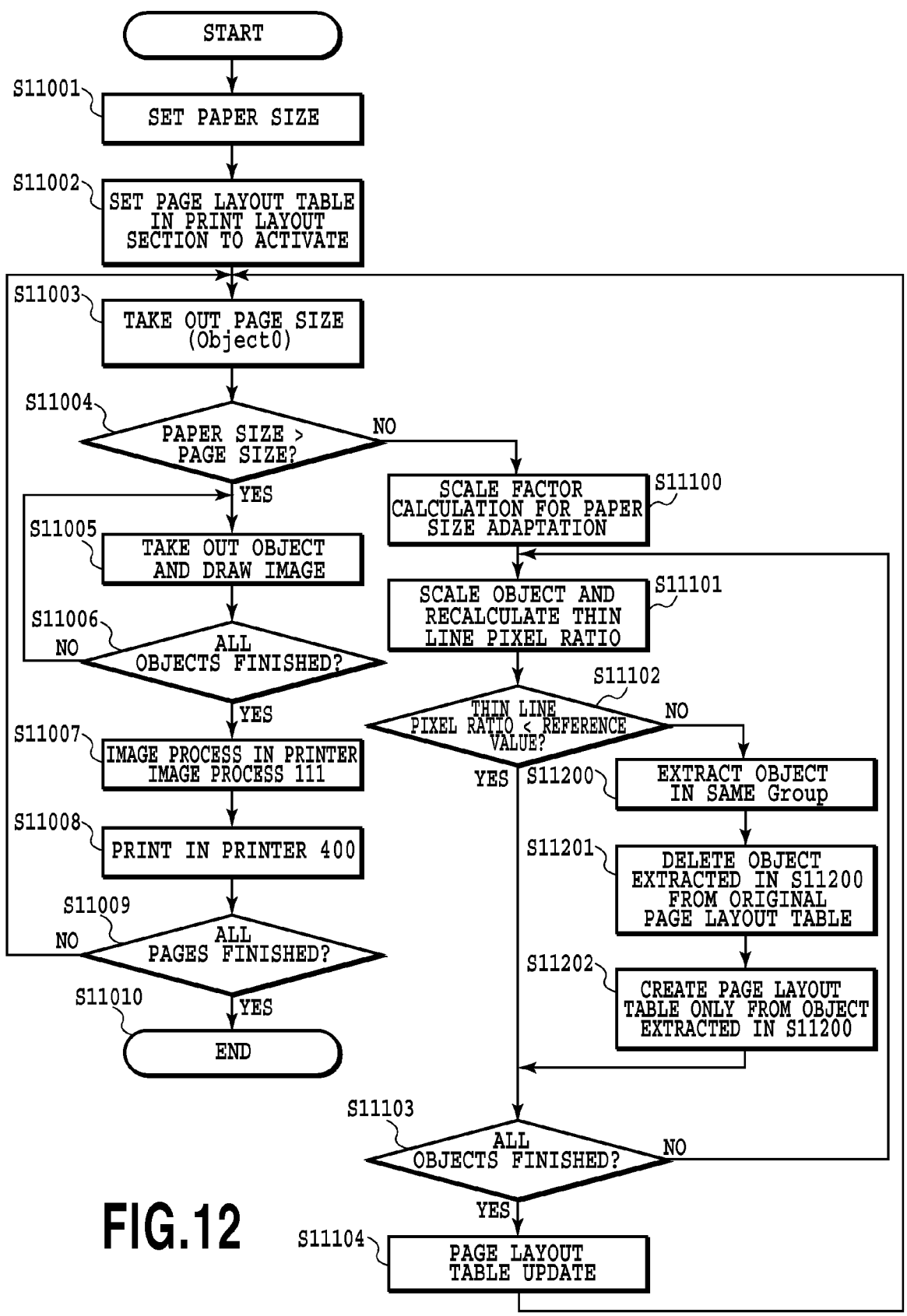
FIG. 12 is a flowchart explaining processing according to embodiment 3 of the present invention.

Then, in accordance with a process shown in flowcharts in FIG. 12, print output corresponding to an instruction of a user or an operator is performed. Specifically, a sheet size is set in the print layout section 110 in accordance with the print setting of a user or an operator (S11001), and the page layout table is set to start an operation (S11002).

Thereupon, the print layout section 110 initially takes out the first Object 0 from the packet data in accordance with the page layout table 3001 of FIG. 5A (S11003).

Since the Object 0 is a background, a page size of an output paper is decided from a size of the object. Then, the sheet size set in step S11001 are compared with the decide page size, and it is determined whether the page size is smaller than the sheet size or not (whether the page size remains in the sheet size without reduction or down-scale) (S11004).

If there is no need for reducing or down-scaling, the object data is taken out from the main memory 104, and is arranged at a position determined in accordance with the reconstructed page layout table 3001, whereby a raster image to be printed is configured (S11005). The raster image is processed in accordance with characteristics of the printer 400 in a printer image process section 111 (S11007), and is printed onto a paper by the printer 400 (S11008).

In step S11002, a plurality of page layout tables can be set. When printing in the print section 400 is finished for all the page layout tables set in step S11002, the process ends (S11100).

Meanwhile, when the sheet size is smaller than the page size in step S11004, the print layout section 110 calculates a scale factor for adapting the page size of the output image to the set sheet size (S11100).

Then, each Object is taken from the main memory 104, and a scaler 113 scales each Object down with the scale factor calculated in step S11100, and transmits the reduced data to the specific pixel counter 108, and the specific pixel counter 108 calculates a ratio of thin line pixels again (S11101).

When the ratio of the thin line pixels recalculated in step S11101 is no greater than a predetermined reference value, the page layout table 3001 is updated to correspond to the objects which were down-scaled in step S11101 (S11104).

The predetermined reference value for thin line pixel ratio depends on characteristics of the printer 400. Therefore, for several kinds of the printer 400, reference values are experimentally found and stored in the HDD (BOX) 107 or the like.

Meanwhile, when the thin line object for which the ratio of the thin line pixels recalculated in step S6101 crosses the reference value determined in advance is present, process from step S6200 is performed. Specifically, an object associated with the thin line object is specified (S11200) by referring to the Object Group List (3006), and two of those related or associated objects are deleted from the original page layout table 3001 (S11201). Next, a page layout table which is configured by including the related or associated objects deleted from the original page layout table 3001 and the background and does not include the other objects is created (S11202). The new page layout table is used for rearranging the two related or associated objects in a page different from the original page.

A page size of the page layout table to which is created is made to the minimum rectangle size including all the objects specified in step S11201. The page layout table created in step S11202 is additionally set in the print layout section 110 in step S11104, and the process from step S11003 is executed again.

FIGS. 10A and 10B show an example of updating an original page layout table and creating a new different page layout table when it is determined in step S11102 that a ratio of thin line pixels recalculated in step S11101 with respect to the Object 4 crosses a reference value.

First, it is found that the Object 5 belongs to a Group 1 from the page layout table (3001), and it is found that another Object which belongs to the Group 1 is the Object 4 from the Object Group List (3006) (S11200). Then, two page layout tables, a page layout table 1 (8100) shown in FIG. 10A which is a result of excluding the Objects 4 and 5 from the original page layout table (3001) and a new different page layout table (8200) shown in FIG. 10B including the Objects 0, 4 and 5, are created. The page size (size of the Object 0) in the page layout table (8200) 2 is the minimum rectangle including the Object 4 and Object 5, and therefore, it is the minimum rectangle required for drawing the Object 5 in this case.

The page layout tables are thus updated (S11104), and the process from step S11003 is executed for each of the updated tables.

Embodiment 4

Figure 13:
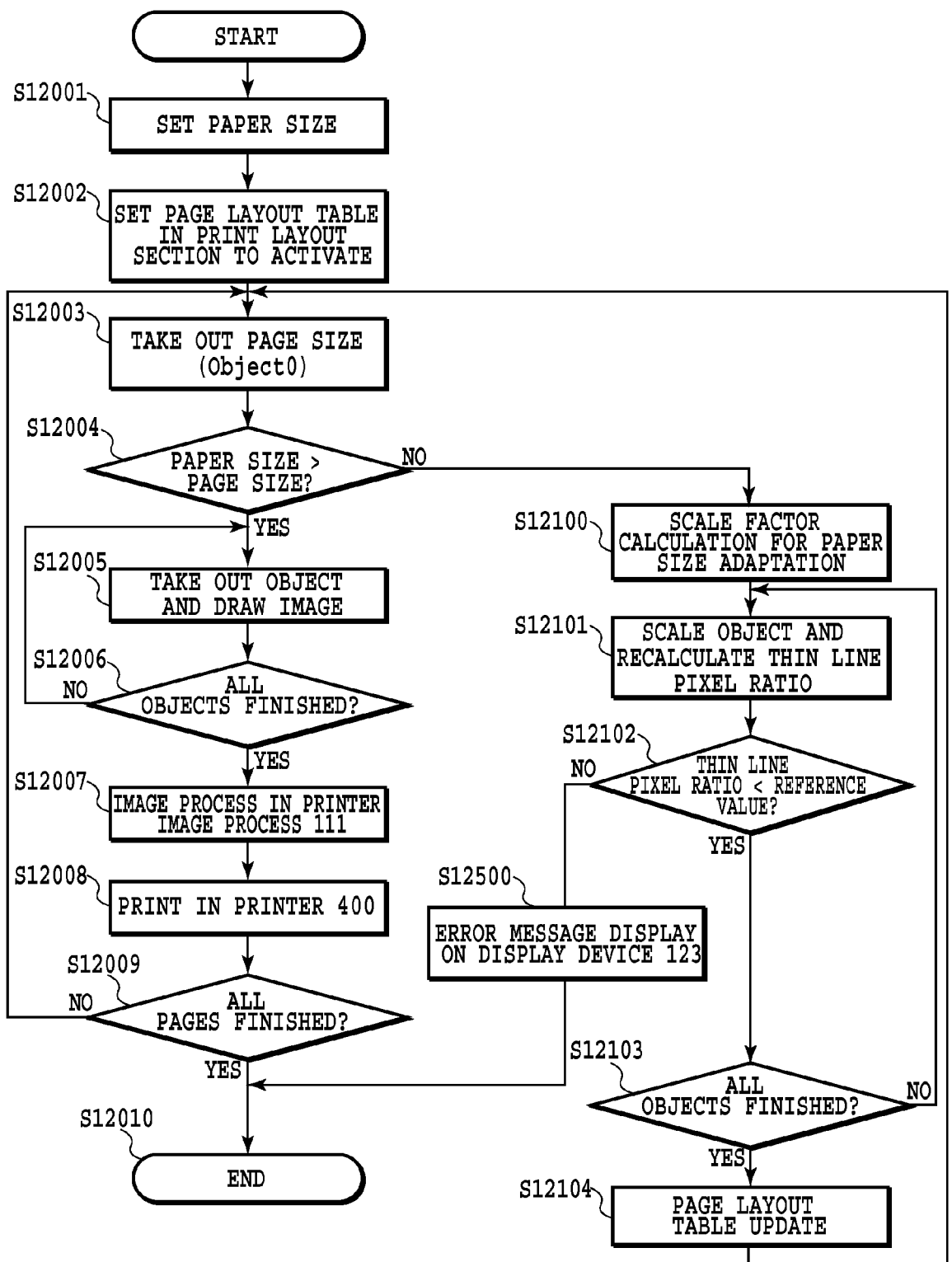
FIG. 13 is a flowchart explaining processing according to embodiment 4 of the present invention.

FIG. 13 is a flowchart explaining processing according to embodiment 4 of the present invention.

In embodiment 3, the thin line objects with the ratios of the thin line pixels recalculated in step S11101 crossing the predetermined reference value are rearranged in a different page. According to the present embodiment an error message is displayed in such a case. Specifically, with respect to a thin line object in which the ratio of thin line pixels recalculated in step S12101 crosses a predetermined reference value, an error message is displayed on the display 123 in step S12500 and then the process ends.

Alternately, instead of the error message display for rearrangement on an different page, rearranging on a different page and displaying a massage informing that the arrangement is changed may be carried out in combination.

Other Embodiments

The present invention may be further applied to a system configured with a plurality of devices (for example, a computer, an interface device, a scanner, a printer and the like), and also may be applied to an apparatus (a multifunctional machine, a facsimile machine and the like) configured in a unit.

An object of the present invention may be also accomplished by causing a computer (or CPU or MPU) of a system or an apparatus to read out and execute a program code from a storage medium storing the program code which realizes the procedure of the flowcharts shown in the above described embodiments. In this case, the program code itself read from the storage medium is a computer program for causing a computer to realize the function of the above described embodiments. Therefore, the program code and the computer-readable storage medium storing/recording the program code configure the present invention.

As the storage medium for supplying the program code, for example, a floppy (registered trademark) disk, a hard disk, an optical disk, a magnetic-optical disk, a CD-ROM, a CD-R, a magnetic tape, a nonvolatile memory card, a ROM and the like may be used.

Further, it can be understood that the functions of the above described embodiments are realized by executing the program read out by the computer. Further, execution of the program also includes an OS or the like which operates on the computer performing a part or all of the actual operations based on instructions of the program.

Further, it can be understood that the functions of the above described embodiments may be realized by an expansion board inserted into a computer or an expansion unit connected to the computer. In this case, a program read out from a storage medium is first written into a memory included in the expansion board inserted into the computer or the expansion unit connected to the computer. Thereafter, a CPU or the like provided in the expansion board or the expansion unit performs a part or all of the actual operations based on instructions of the program. The functions of the above described embodiments are also realized by the processing by such an expansion board or an expansion unit.

While the present invention has been described with reference to exemplary embodiments, it can be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-203424, filed Aug. 3, 2007, which is hereby incorporated by reference herein in its entirety.

What is claimed is:

1. An image forming apparatus for outputting an image corresponding to image data onto a sheet, comprising:
   separating means for separating a plurality of objects from said image data, wherein said plurality of objects are arranged in a single page in accordance with said image data;
   determining means for determining whether each of the separated objects is a character object or not;
   calculating means for calculating with respect to an object determined as a character object a ratio of pixels configuring a character in the determined object to all pixels in said determined object to identify a character object in which said ratio crosses a predetermined reference value when said plurality of objects in said single page are scaled and arranged in a sheet whose size is set by a user; and
   performing means for performing process of read error suppression for the character object identified by said calculating means when it is outputted on a sheet.

2. The apparatus as in claim 1, wherein said performing means includes arranging means for arranging said plurality of objects on said sheet while adapting sizes of said plurality of objects to said user set size of said sheet, wherein said identified character object is rearranged on a different page.

3. The apparatus as in claim 2, wherein said arranging means lays out an object of said plurality of objects on said different page together with said identified character object, and wherein the object laid out is different from and associated with said identified character object.

4. The apparatus as in claim 2, wherein said arranging means includes: a page layout table indicative of a size and a position necessary for drawing each of said plurality of objects; and deleting means for deleting said identified character object from said page layout table to create a different page layout table including the deleted character object.

5. The apparatus as in claim 1, wherein said performing means outputs an error message with respect to said identified character object.

6. An image forming apparatus for outputting an image corresponding to image data onto a sheet, comprising:
   separating means for separating a plurality of objects from said image data, wherein said plurality of objects are arranged in a single page in accordance with said image data;
   determining means for determining whether each of the separated objects is a thin line object or not;
   calculating means for calculating, with respect to an object determined as a thin line object, a ratio of pixels configuring a thin line in the determined object to all pixels in said determined object to identify a thin line object in which said ratio crosses a predetermined reference value when said plurality of objects in said single page are scaled and arranged in a sheet whose size is set by a user; and
   performing means for performing process of read error suppression for the thin line object identified by said calculating means when it is outputted on a sheet.

7. The apparatus as in claim 6, wherein said performing means includes: arranging means for arranging said plurality of objects on said sheet while adapting sizes of said plurality of objects to said user set size of said sheet, wherein said identified thin line object is rearranged on a different page.

8. The apparatus as in claim 7, wherein said arranging means lays out an object of said plurality of objects on said different page together with said identified thin line object, and wherein the object laid out is different from and associated with said identified thin line object.

9. The apparatus as in claim 7, wherein said arranging means includes: a page layout table indicative of a size and a position necessary for drawing each of said plurality of objects; and deleting means for deleting said identified thin line object from said page layout table to create a different page layout table including the deleted thin line object.

10. The apparatus as in claim 6, wherein said performing means outputs an error message with respect to said identified thin line object.

11. An image forming method for outputting an image corresponding to image data onto a sheet, comprising the steps of:
separating a plurality of objects from said image data, wherein said plurality of objects are arranged in a single page in accordance with said image data;
determining whether each of the separated objects is a character object or not;
calculating, with respect to an object determined as a character object, a ratio of pixels configuring a character in the determined object to all pixels in said determined object to identify a character object in which said ratio crosses a predetermined reference value when said plurality of objects in said single page are scaled and arranged in a sheet whose size is set by a user; and
performing process of read error suppression for the character object identified in said calculating step when it is outputted on a sheet.

12. The method as in claim 11, wherein said performing step includes a step of arranging said plurality of objects on said sheet while adapting sizes of said plurality of objects to said user set size of said sheet, wherein said identified character object is rearranged on a different page.

13. The method as in claim 12, wherein said arranging step includes laying out an object of said plurality of objects on said different page together with said identified character object, and wherein the object laid out is different from and associated with said identified character object.

14. The method as in claim 12, wherein said arranging step includes deleting said identified character object from a page layout table indicative of a size and a position necessary for drawing each of said plurality of objects to create a different page layout table including the deleted character object.

15. The method as in claim 11, wherein said performing step includes outputting an error message with respect to said identified character object.

16. An image forming method for outputting an image corresponding to image data onto a sheet, comprising the steps of:
separating a plurality of objects from said image data, wherein said plurality of objects are arranged in a single page in accordance with said image data;
determining whether each of the separated objects is a thin line object or not;
calculating, with respect to an object determined as a thin line object, a ratio of pixels configuring a thin line in the determined object to all pixels in said determined object to identify a thin line object in which said ratio crosses a predetermined reference value when said plurality of objects in said single page are scaled and arranged in a sheet whose size is set by a user; and
performing process of read error suppression for the thin line object identified in said calculating step when it is outputted on a sheet of paper.

17. The method as in claim 16, wherein said performing step includes a step of arranging said plurality of objects on said sheet while adapting sizes of said plurality of objects to said user set size of said sheet, wherein said identified thin line object is rearranged on a different page.

18. The method as in claim 17, wherein said arranging step includes laying out an object of said plurality of objects on said different page together with said identified thin line object, and wherein the object laid out is different from and associated with said identified thin line object.

19. The method as in claim 17, wherein said arranging step includes deleting said identified thin line object from a page layout table indicative of a size and a position necessary for drawing each of said plurality of objects to create a different page layout table including the deleted thin line object.

20. The method as in claim 16, wherein said performing step includes outputting an error message with respect to said identified thin line object.

21. A computer-readable medium storing instructions for causing a computer to perform the steps of:
separating a plurality of objects from said image data, wherein said plurality of objects are arranged in a single page in accordance with said image data;
determining whether each of the separated objects is a character object or not;
calculating, with respect to an object determined as a character object, a ratio of pixels configuring a character in the determined object to all pixels in said determined object to identify a character object in which said ratio crosses a predetermined reference value when said plurality of objects in said single page are scaled and arranged in a sheet whose size is set by a user; and
performing process of read error suppression for the character object identified in said calculating step when it is outputted on a sheet.

22. A computer-readable medium storing instructions for causing a computer to perform the steps of:
separating a plurality of objects from said image data, wherein said plurality of objects are arranged in a single page in accordance with said image data;
determining whether each of the separated objects is a thin line object or not;
calculating, with respect to an object determined as a thin line object, a ratio of pixels configuring a thin line in the determined object to all pixels in said determined object to identify a thin line object in which said ratio crosses a predetermined reference value when said plurality of objects in said single page are scaled and arranged in a sheet whose size is set by a user; and
performing process of read error suppression for the thin line object identified in said calculating step when it is outputted on a sheet of paper.

* * * * *